US008052874B2

(12) United States Patent
Livingston et al.

(10) Patent No.: US 8,052,874 B2
(45) Date of Patent: Nov. 8, 2011

(54) METHOD USING MEMBRANE BIOREACTOR WITH REDUCED AIR SCOUR REQUIREMENTS

(75) Inventors: Dennis Livingston, Austin, TX (US); James Porteous, Austin, TX (US); Elena Bailey, Cedar Park, TX (US)

(73) Assignee: Ovivo Luxembourg S.a.r.l., Munsbach (LU)

( * ) Notice: Subject to any disclaimer, the term of this patent is extended or adjusted under 35 U.S.C. 154(b) by 368 days.

(21) Appl. No.: 12/386,675

(22) Filed: Apr. 20, 2009

(65) Prior Publication Data
US 2010/0264080 A1 Oct. 21, 2010

(51) Int. Cl.
*C02F 3/00* (2006.01)

(52) U.S. Cl. ........ 210/620; 210/621; 210/622; 210/631; 210/797

(58) Field of Classification Search .......... 210/620–622, 210/631, 797
See application file for complete search history.

(56) References Cited

U.S. PATENT DOCUMENTS

| 4,192,742 | A | | 3/1980 | Bernard et al. | |
|---|---|---|---|---|---|
| 4,556,491 | A | * | 12/1985 | Spector et al. | 210/608 |
| 5,254,253 | A | * | 10/1993 | Behmann | 210/607 |
| 5,316,682 | A | * | 5/1994 | Keyser et al. | 210/649 |
| 6,712,970 | B1 | | 3/2004 | Trivedi | |
| 6,743,362 | B1 | | 6/2004 | Porteous et al. | |
| 7,147,777 | B1 | | 12/2006 | Porteous | |
| 7,311,833 | B2 | | 12/2007 | Yamamoto et al. | |
| 7,654,728 | B2 | * | 2/2010 | Wood et al. | 366/170.3 |

* cited by examiner

*Primary Examiner* — Chester Barry
(74) *Attorney, Agent, or Firm* — Thomas M. Freiburger

(57) ABSTRACT

In a sewage treatment plant with a membrane bioreactor (MBR), raw untreated or partially treated wastewater (influent) and/or mixed liquor in the intensified process is superoxygenated. In a preferred form of the process the influent is superoxygenated such that membrane air scouring requirements are reduced. Influent may be fed to a swing zone where denitrification and nitrification occur simultaneously through process control. In one embodiment superoxygenation is conducted in an internal recycle stream of the mixed liquor, with oxygen content supersaturated preferably to over 300 parts per million. Due to the active evolution of oxygen gas from the supersaturated stream, occurring preferably by seeding the supersaturated stream with air bubbles, the supersaturated oxygen can serve the dual purposes of meeting process oxygen demands and providing part of air scouring requirements for the membranes.

21 Claims, 6 Drawing Sheets

METHOD USING MEMBRANE BIOREACTOR WITH REDUCED AIR SCOUR REQUIREMENTS

BACKGROUND OF THE INVENTION

This invention concerns sewage treatment processes and systems, and particularly involves a method and system used in a plant having membrane bioreactors that intensify a treatment process, for lowering air scour requirements through superoxygenation of raw wastewater feed (influent) or mixed liquor in the MBR tank, while providing needed oxygen for the intensified process. The method of oxygenating the influent can also break down refractory organics, improving process efficiency.

Membrane air scouring is necessary to remove the solids that accumulate during filtration and generally accounts for 25%-75% of total overall system energy demand. Due to inefficient diffusers and oxygen transfer rate (OTR) limitations, much of the oxygen contained in scouring air is wasted to the atmosphere instead of being used for biological processes. Moreover, increasing mixed liquor suspended solids (MLSS) concentration for the purposes of reducing process volumes further reduces OTR, requiring systems to be larger and more complicated to operate. This invention uses a stream of supersaturated influent and/or mixed liquor to reduce the amount of air required for membrane scouring purposes and provide all or most of the biological process oxygen. This invention reduces or eliminates the need for diffused aeration.

Most submerged MBR technologies use diffused aeration to scour away materials that accumulate on membrane surfaces during filtration (so called jet aeration is an alternative). Generally, coarse bubble aeration has been shown to be the most efficient means of air scouring but it is the least efficient means of delivering oxygen to the biological process. Given increasing energy costs, some manufacturers have turned to fine-bubble diffusers for better oxygen delivery and to provide air scouring, with attendant maintenance issues and increased equipment costs. Regardless of the aeration technology used to provide scouring air, the oxygen transfer rate (OTR) limits how much a biological process can be intensified (volume reduced) as diffuser performance drops off precipitously with increasing mixed liquor suspended solids concentrations (MLSS).

Prior oxygenation systems have been proposed that introduce (pure) oxygen into mixed liquor through agitation or mixing. However, these technologies introduce oxygen into other zones in the biological flow sheet and not directly into the influent or the MBR tank, and none has suggested utilizing the supersaturated oxygen to meet some of the membrane air scour requirements.

Due to increased energy costs, it would be greatly advantageous if supersaturation of oxygen could be used in an MBR system for both process enhancement through increased oxygen content and for scouring aeration, to thereby reduce separate air scour requirements.

SUMMARY OF THE INVENTION

In accordance with this invention, by supersaturating an internally recycled stream of mixed liquor or influent (pretreated sewage) with oxygen and introducing a small amount of pre-formed seed bubbles (or diffuser air bubbles), the need for diffused air can be reduced and the process made more efficient. Using the oxygen contained in a stream of supersaturated mixed liquor or influent in place of diffused air for scouring and process needs can reduce total system energy requirements by 25%-50%, increase space efficiency by 25%-50%, simplify process flow sheets, reduce system maintenance requirements and potentially partially convert refractory organics into readily biodegradable materials.

MBR technologies allow for what is called process intensification. Activated sludge processes are intensified as the concentration of active biomass is increased and proportionally process volume is decreased. Using membranes instead of sedimentation to remove solids allows for concentrations 3-5 times higher than for conventional technologies. However, further intensification is primarily limited by oxygen uptake rate (OTR) required for the biological process. OTR is a function of oxygen saturation, which at ambient conditions is about 10 ppm, and diffuser performance. Supersaturating process influent, an internal recycle stream or both overcomes both of these limitations and can increase the intensification factor by 25%-50% depending on process conditions (e.g. food to mass ratio).

Typically conventional activated sludge plants run at MLSS concentrations around 3,000 mg/l. Typical sMBR plants run at 10,000 mg/l when optimized for energy and given diffuser performance limitations at higher solids concentrations. The preferred range of MLSS concentrations is 20,000 mg/l to 30,000 mg/l for this invention.

Influent mixed liquor pursuant to the invention can be supersaturated (relative to ambient oxygen saturation) with oxygen to more than 50 ppm, or a range of about 250 to about 300 ppm. Superoxygenation can be to over 300 ppm (generally requiring about 100 p.s.i. pressure). However, added oxygen stays in solution or evolves as fine micro-bubbles that are not effective for air scouring purposes due to low rise velocity. It is generally accepted that a rise velocity on the order of 1.5 ft/sec will induce the most efficient hydraulic flow regime for membrane scouring purposes.

The invention supersaturates (relative to ambient), under pressure, a pumped influent and/or an internal recycle (IR) stream (i.e. from the membrane tank back to the same tank) with oxygen and subsequently co-mingles that stream with a small amount of pre-formed (seed) bubbles. These can constitute, for example, less than 10% of the volume of the oxygen bubbles emerging from solution. The co-mingled stream is then discharged into a reactor beneath submerged membranes where dissolved oxygen evolves as larger bubbles that rise at a sufficient velocity to induce air scouring, in a first embodiment as described below.

A second embodiment uses supplemental diffused aeration combined with co-mingled bubbles and a third embodiment uses only diffused bubbles for seeding purposes. Seed bubbles, however contacted with the oxygen saturated IR, allow evolving oxygen to form larger bubbles with sufficient rise velocities to induce effective membrane air scouring.

It is thus among the objects of the invention to improve efficiency of MBR systems in treatment plants by combining superoxygenation of influent or MLSS with the air scouring function. These and other objects, advantages and features of the invention will be apparent from the following description of preferred embodiments, considered along with the accompanying drawings.

DESCRIPTION OF PREFERRED EMBODIMENTS

Figure 1:
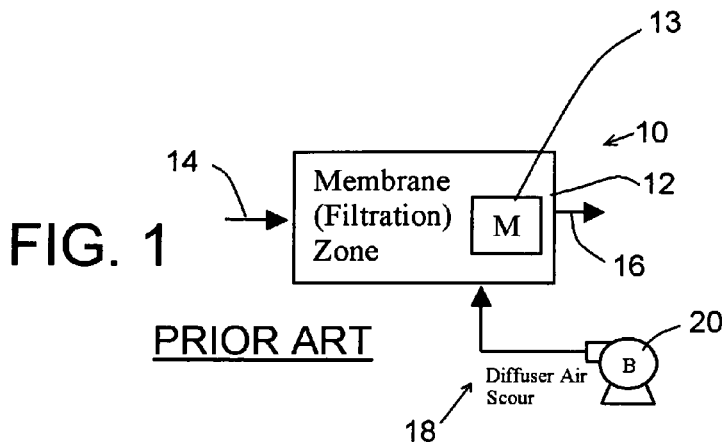
FIG. 1 is a diagram showing a prior art membrane filtration system in a treatment plant, with air scour.

FIG. 1 shows, in a simple diagrammatic form, a typical prior art membrane filtration system or MBR (membrane bioreactor) system, as used in a sewage treatment facility. The figure indicates a system 10 with a membrane filtration zone 12 that contains a series of membrane filtration units. The submerged membranes receive mixed liquor or MLSS (mixed liquor suspended solids) entering the zone as indicated by the arrow 14, and liquid filtrate or permeate is indicated exiting the tank or zone with the arrow 16. As also is typical, air scour is shown at 18, with a blower 20 releasing a multiplicity of vigorously rising air bubbles from below the membranes 13. The air scour removes sludge from the surfaces of the membranes as the filtration progresses, and also provides oxygen for the microbial action that occurs in the zone 12.

Figure 2:
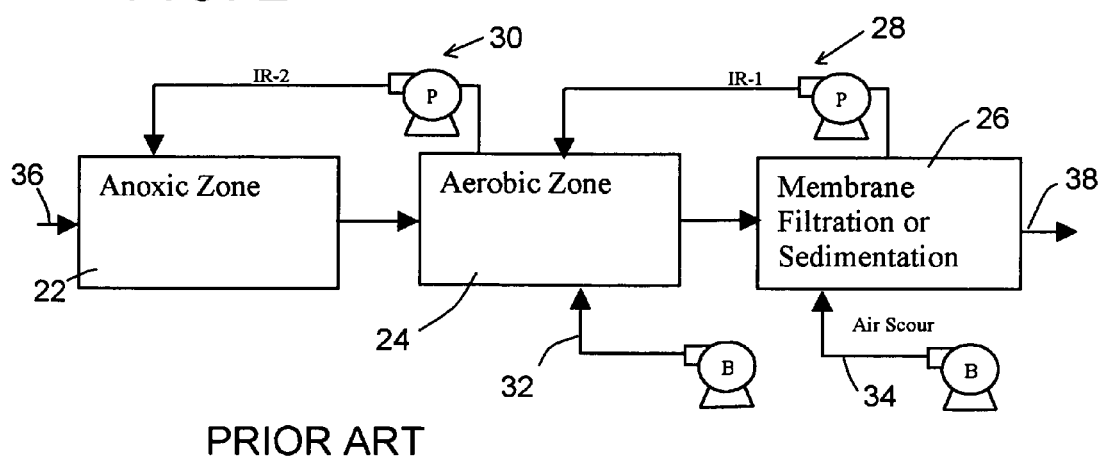
FIG. 2 is another diagram showing a typical MBR process flow sheet.

FIG. 2 shows a prior art process involving membrane filtration, a typical MBR process flow sheet, with an anoxic zone or tank 22, an aerobic zone or tank 24 and a membrane filtration zone or tank 26 (which, in many prior art systems, can be a sedimentation tank rather than an MBR tank). One recycle of MLSS is shown at 28, from the MBR zone 26 back to the aerobic zone 24. Another recycle stream is shown at 30, from the aerobic zone 24 back to the anoxic zone 22 (the letter P indicates a pump). Process air is shown being admitted to the aerobic zone at 32, and air scour is shown applied beneath the MBRs at 34 (the letter B indicates a blower). Influent wastewater is shown entering the system at 36, and effluent permeate from the membrane filtration is shown exiting the system at 38. Whether MBR or sedimentation is used in this zone 26, solids must be removed periodically or continuously for further treatment usually in digesters in the solids side of a treatment plant.

This is a typical denitrification process at the liquid side of a sewage treatment plant. In the anoxic zone 22 the microbes acting on the MLSS are given access to a limited supply of oxygen, so that the microbes utilize the oxygen from nitrates in the wastewater being treated, thereby giving off nitrogen gas. In the aerobic zone 24, process air 32 provides plenty of oxygen and the ammonia in solution is broken down, with the nitrogen being attached to oxygen to form nitrate. The MLSS recycle 30 brings much of this nitrate back to the anoxic zone, to be reduced to free nitrogen. In the MBR zone 26, the MLSS is greatly concentrated by withdrawal of the permeate at 38, and much of this concentrated MLSS is returned via the recycle 28 to the aerobic zone 24. The resulting sludge that is removed from the zone 26 is relatively low in nitrogen. All of this is very well known in the art.

Figure 3:
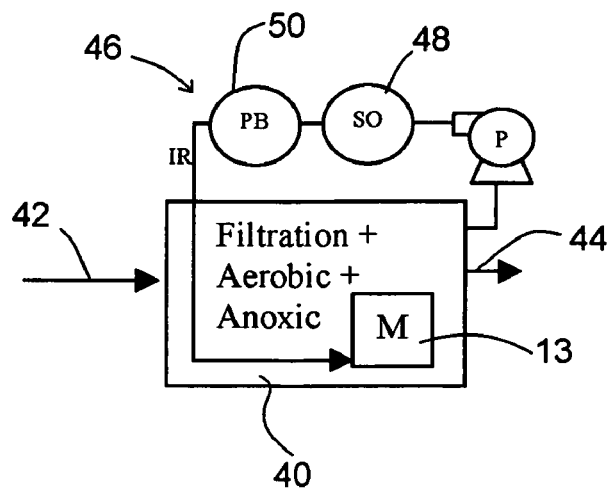
FIG. 3 is a further diagram showing an embodiment of a system of the invention.

FIG. 3 shows a first embodiment of the system of the invention. Here, a MBR reactor zone or tank 40 receives influent MLSS at 42 and discharges liquid permeate at 44. An internal recycle is shown at 46, in which MLSS is moved by a pump P to be supersaturated with oxygen ("SO"), at 48, under pressure, i.e. beyond ambient pressure saturation level. The supersaturated MLSS recycle stream is then reintroduced to the tank 40, but is first "seeded" with pre-formed bubbles PB, at 50. The oxygen-supersaturated recycle stream with the seed bubbles is reintroduced into the tank below the membrane units 13 and, as explained above, the seed bubbles provide a medium for the dissolved oxygen to evolve into bubbles that are large enough to have a sufficient rise velocity to provide air scour for the membranes. Thus, the evolving oxygen can provide some of the air scour requirement, while the oxygen also serves the biological needs of the intensified process.

Although FIG. 3 can represent an MBR zone or tank in a system having other zones for denitrifying the mixed liquor, in a preferred embodiment the illustrated MBR zone 40 is a simultaneous nitrification/denitrification zone, wherein MBR filtration is constant and the MLSS undergoes alternating periods of aerobic and anoxic conditions. This is achieved by lowering and limiting the oxygen content of the recycled MLSS (to about 1.0 ppm oxygen) to produce anoxic conditions, even though the superoxygenation and seed bubble introduction continue. The rate of recycle pumping can be adjusted if needed, to balance the system so that oxygen demand is only met to the target limited extent while leaving some oxygen as air scour bubbles that ultimately go to atmosphere. This simultaneous nitrification/denitrification process is discussed in U.S. Pat. No. 6,712,970, and as carried out in an MBR tank, is discussed in U.S. Pat. No. 6,743,362, both patents owned by the assignee of this invention. Thus, in the tank 40 anoxic conditions are created to the point that microbes consume the oxygen in nitrates and thus release nitrogen gas; and aerobic conditions also exist, with adequate oxygen so that further breakdown of ammonia commences. Note that in the embodiment shown in FIG. 3 no additional air is used for air scouring of the MBRs 13, only the dissolved and evolving oxygen along with the seed bubbles.

Figure 4:
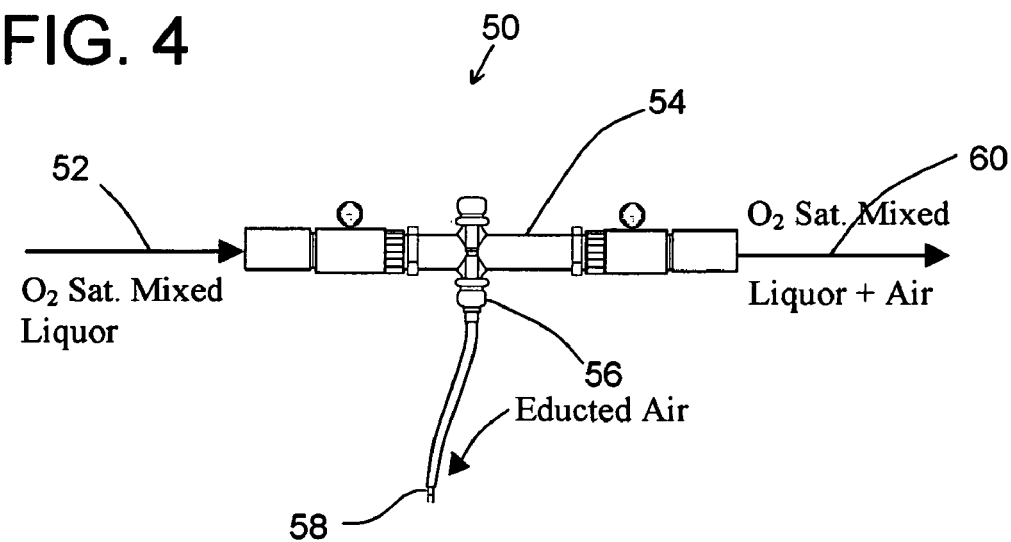
FIG. 4 is a side view showing a static air eductor for mixing air into an oxygen-saturated mixed liquor stream.

FIG. 4 shows one method for introducing "seed" air bubbles into the oxygen-supersaturated MLSS recycle flow. Oxygen-supersaturated mixed liquor is shown at 52 entering through connections into an eductor 54 arranged in line in the recycle flow. The MLSS stream flows through the eductor 54 which has a side air port 56 for venturi-activated drawing in of air, through the end of a tube 58. The eductor is internally configured to draw the air in the form of small bubbles, which mix together with the oxygen-supersaturated MLSS flow, emerging at 60. This assembly serves as the seed bubble introduction device 50 shown in FIG. 3 and also in other drawings.

Figure 5:
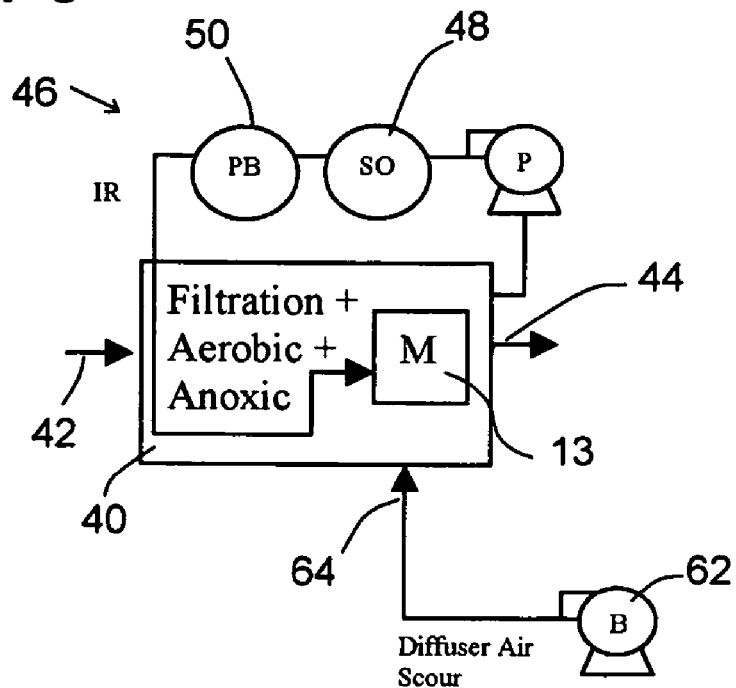
FIG. 5 is a diagram showing a second embodiment of the system of the invention.

FIG. 5 shows another embodiment of the invention, similar in many respects to the first embodiment shown in FIG. 3 but with some air scour of the membranes 13 introduced, using a diffuser driven by a blower 62. In this case the air scour provided by the evolving oxygen bubbles with seed air is supplemented by diffuser air scour at 64, still at a greatly reduced air scour flow rate from that typically used in prior art systems such as in FIG. 1. For example, diffuser air scour in this embodiment can be reduced by 10%-50% as compared to the typical system shown in FIG. 1.

Figure 6:
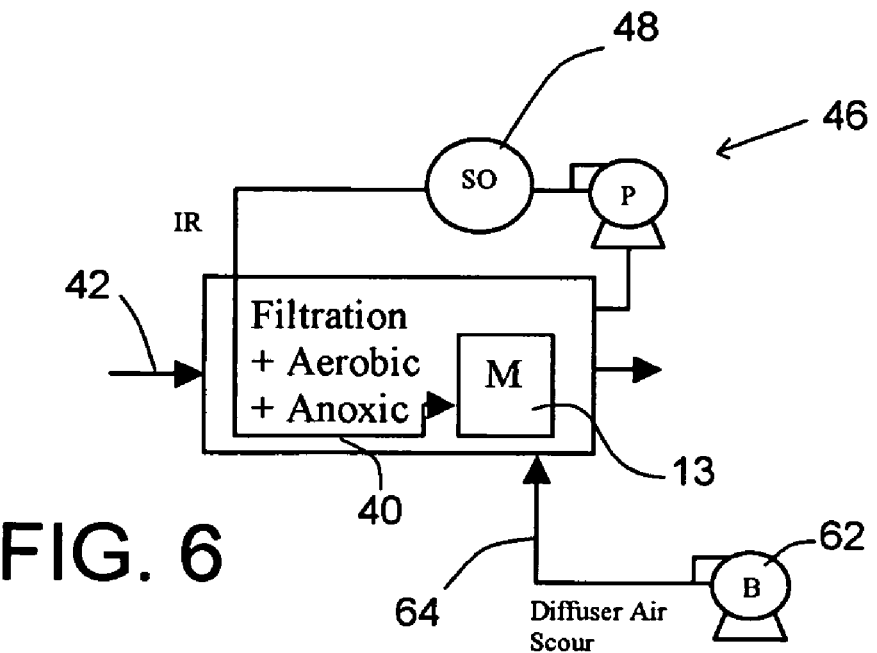
FIG. 6 is another schematic diagram showing a variation of the system.

FIG. 6 shows a variation of the invention in which the introduction of seed bubbles is not included. Oxygen supersaturation is shown at 48 in the recycle stream 46, and this recycle stream is reintroduced into the tank 40 below the membrane units 13, as in previously described embodiments. Diffuser air scour is again shown at 62, 64. In this case, the air scour, at a greatly reduced rate as compared to prior art, provides "seed" bubbles for the oxygen evolving from solution, and the diffuser air and the evolving oxygen bubbles together provide sufficient air bubbles with sufficient rise velocity to perform air scour efficiently. In this embodiment the air scour rate at 64 is typically somewhat higher than in the embodiment shown in FIG. 5.

The system embodiments of FIGS. 5 and 6 can have the influent treated directly at the inflow to the MBR zone at 42. This can be alternative to or in addition to the IR oxygenation shown.

Figure 7:
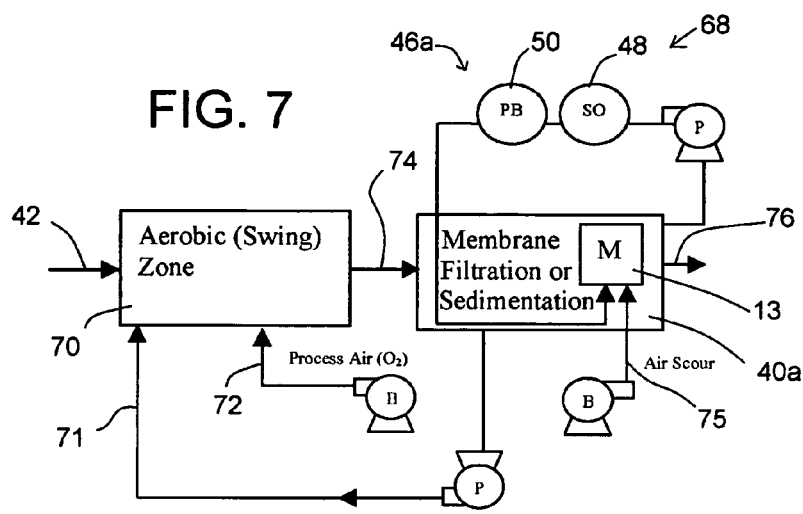
FIG. 7 is a diagram showing a further embodiment of the invention.

FIG. 7 shows a modified system 68 in which a recycle stream 46a is pumped into back into the MBR zone 40a as in FIG. 5, but the system including another process zone 70 which receives recycle 71 from the MBR zone 40a, while also receiving influent 42. In the recycle stream 46a the supersaturation of oxygen is conducted as shown at 48 and pre-formed seed bubbles are injected as indicated at 50. This recycle is delivered into the tank 40a beneath the membranes 13 as in FIGS. 5 and 6. The aerobic or swing zone 70 serves as an anoxic and aerobic zone, receiving input wastewater 42 and the recycle stream 71. Process air for this zone is shown at 72, introduced by a blower. This process air 72 can be varied from a high flow rate to a low flow rate, or oxygen content can otherwise be controlled, to maintain in the zone 72 aerobic and anoxic conditions, functioning to remove nitrogen as explained above for other embodiments. The nitrogen-reduced MLSS then progresses, as indicated at 74, into the membrane tank 40a (which could be a sedimentation tank). Air scour for the membranes is shown at 75, delivered from air diffusers to clean the membranes 13, but at greatly reduced flow because evolving bubbles from the recycle stream 46a, i.e. oxygen bubbles which are mixed with the preformed bubbles (PB) perform significant air scour. The system of FIG. 7 has advantages in that in the MBR zone 40a the MLSS has been thickened, sometimes to about 3%, and process oxygen demands are higher as reviewed above. Thus, the superoxygenated recycle is important for supplying process oxygen, as well as for producing bubbles or air scour as in the other embodiments. An important attendant advantage is that the supersaturation with oxygen at 48 can be controlled. The oxygen is introduced into solution under pressure, and that pressure can be controlled as desired, in order to finely tune the oxygen content in the MLSS in the zone 40a. This ability for accurate process turndown, or "rangeability" of the system, provides an important process control that cannot be achieved with blowers and diffusers normally used. Diffusers are affected by thickness of the MLSS, and the efficiency of the air injection diminishes with thickening sludge. This advantage also occurs with the above described embodiments as well. In this system simultaneous nitrification/denitrification is conducted in the separate swing zone 70. Liquid permeate is withdrawn at 76. Again, the FIG. 7 embodiment can include oxygen supersaturation at the swing zone influent at 42, along with or as an alternative to the recycle SO injected at 48.

Figure 8:
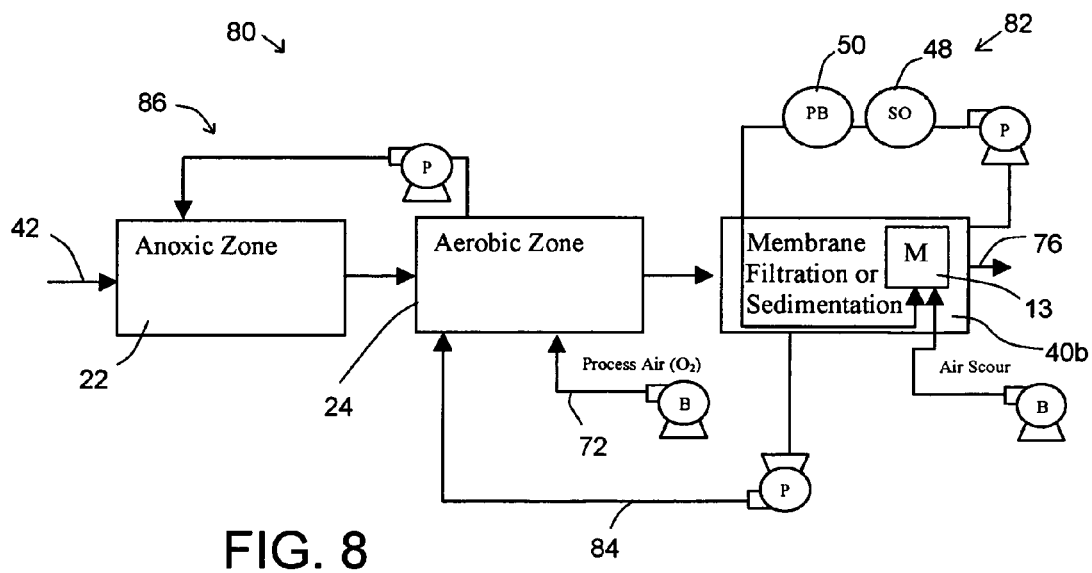
FIG. 8 is another diagram showing another embodiment of the invention.

In the system 80 of FIG. 8 a further modification is made from the earlier embodiments. Separate anoxic and aerobic zones 22 and 24 are included. A first recycle stream 82 recycles mixed liquor from and back to the membrane tank 40b, as in FIG. 7. A second recycle stream 84 recycles MLSS from the zone 40b to the aerobic zone 24, while a third recycle stream 86 recycles MLSS from the aerobic to the anoxic zone 22. Process air 72 provides aerobic conditions in the aerobic zone 24. A comparison of this figure to the prior art of FIG. 2 will show that the systems are similar, except that in the MBR filtration (or sedimentation) zone 40b the MLSS stream in the recycle 82 includes supersaturating the stream with oxygen at 48 and introduction of seed bubbles at 50, which, as explained above, provide accurate system rangeability for oxygen content in the zone 40b while also reducing air scour requirements for the membranes. Again, supersaturated oxygen could be introduced at 42.

Figure 9:
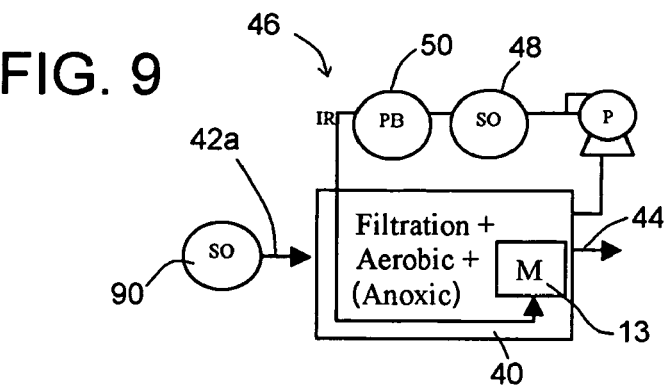
FIG. 9 is a schematic diagram showing another embodiment of the invention, with supersaturation of oxygen in an influent stream.

FIG. 9 shows another variation of the system, basically a variation of the system of FIG. 3. The difference here is that the influent wastewater stream 42a, as well as the internal recycle, is supersaturated with oxygen, as indicated at 90. This can be advantageous in controlling the oxygen content in the MBR zone 40. As noted above, pressure can be varied, through an infinite range of variation, to introduce as much oxygen at 90, as well as at 48, as the process requires. The influent wastewater at 42a is much diluted as compared to the thickened MLSS resulting from the MBR zone 40, so that oxygen content can be varied using adjustable supersaturation of oxygen at two different stages of the process. The oxygen-supersaturated influent 42a can be admitted directly beneath the membranes 13, along with the oxygenated and bubble-seeded recycle stream 46, to produce air scour. Although the zone 40 may be a swing zone (simultaneous nitrification/denitrification) as in FIG. 3, it can optionally be simply an aerobic zone (thus the word "anoxic" is in parentheses).

Figure 10:
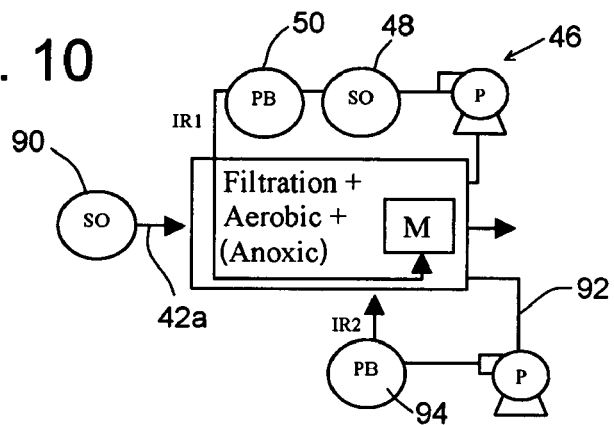
FIGS. 10 and 11 are schematics showing variations of the embodiments shown in FIG. 9.

FIG. 10 is a variation of FIG. 9, with a second recycle stream 92 reintroducing MLSS with preformed bubbles as noted at 94. This stream thus supplements the preformed bubbles introduced at 50 to involve oxygen bubbles at a position to scour the membranes. As in FIG. 9, this zone can be simply aerobic if desired.

Figure 11:
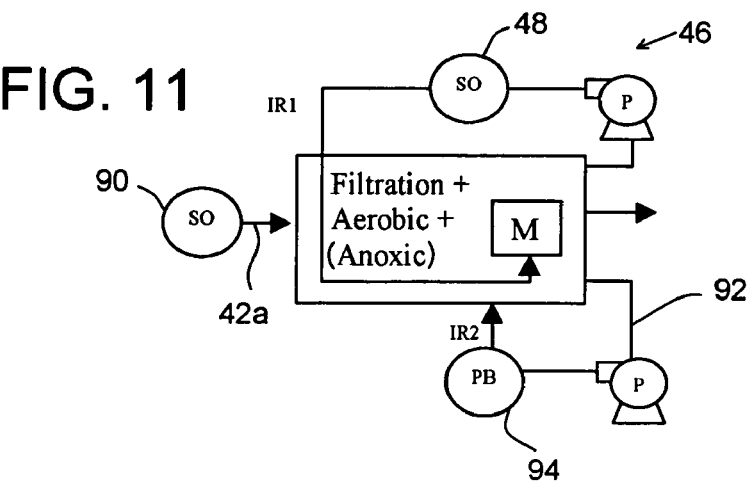

In FIG. 11, the system of FIG. 10 is modified to deliver seed bubbles only via the recycle stream 92, without introducing preformed bubbles in the recycle stream 46. Again, the preformed bubbles in the recycle stream 92 in both FIGS. 10 and 11 can serve to evolve bubbles from the influent stream 42a as well as from the recycle stream 46. As in FIG. 9, this can be simply an aerobic zone if desired.

In a variation, any of the systems of FIGS. 9-11 can receive supersaturated oxygen only at the influent 42a if desired, eliminating the SO by recycle stream. See also FIG. 12 and the discussion below.

Figure 12:
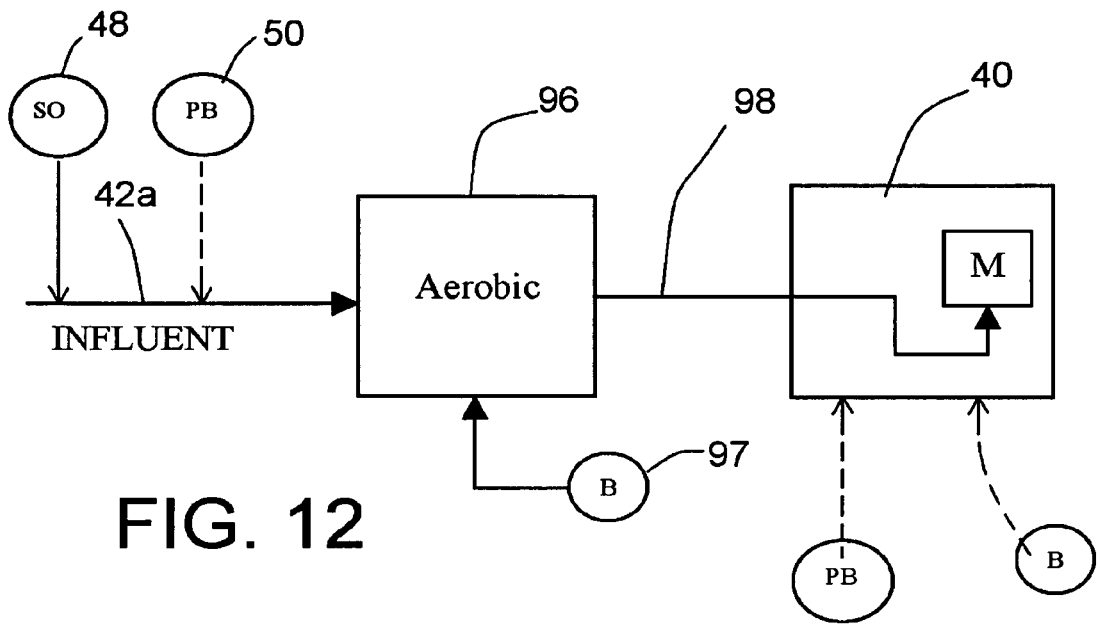
FIG. 12 is a schematic diagram showing a variation of a system with influent being supersaturated.

FIG. 12 shows a variation of the system shown in FIGS. 9-11. Here, influent wastewater enters at 42a, and this influent is treated with oxygen supersaturation "SO", indicated at 48, and then with preformed seed bubbles "BB", indicated at 50. In the example system illustrated, an aerobic stage 96 is positioned as a first stage in the liquid side treatment, and this stage is followed by an MBR zone 40. As an example, oxygen content can be about 300 ppm as the influent enters the aerobic zone at 42a. An air blower 97 can be included. The process will take up much of the oxygen, and about 100 ppm may remain in the MLSS entering the MBR zone at 98. This oxygen will partly be taken up as process oxygen in the MBR tank 40 and partly released to atmosphere via evolved bubbles. The zone 40 may be at about 10 ppm. Optional pre-formed seed bubbles and optional blower are indicated. In this system, as explained above, the supersaturation with oxygen occurs at the initial influent to the system (as in FIGS. 9-11) rather than in an internal recycle in the MBR zone from 40 as in FIG. 3.

As an alternative, the influent can be fed directly to an MBR zone 40, with the influent treated with oxygen supersaturation and preferably introduction of seed bubbles, which would be at position 98 shown in FIG. 12. The MBR zone 40 can be a simultaneous nitrification/denitrification zone as in FIG. 3. This can have the same advantages as oxygenation of the recycle as in FIG. 3, and can potentially have further advantages as described above. Such a system would be similar to FIG. 9, 10 or 11 without the recycle stream.

Supersaturating mixed liquor with oxygen drives up the DO concentration in the liquid phase to 300 ppm or 30 times typical saturation levels and can be roughly 80% more efficient than diffused aeration. The typical air scour range 0.009-0.018 SCFM. This invention reduces air scour demand to between 0.005-0.009 SCFM. The supersaturated dissolved oxygen tends to remain in solution in the liquid, not significantly evolving as bubbles until something triggers their release, such as the seed bubbles described herein.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In a sewage treatment system and process, a method for increasing efficiency in an MBR zone with membrane separators in which water is removed from mixed liquor, wherein superoxygenation and air scour are employed, comprising:
    supersaturating influent wastewater or mixed liquor with oxygen prior to biological treatment, so that the wastewater or mixed liquor is oxygenated beyond normal saturation content of water, to an oxygen content of at least 50 parts per million,
    introducing the oxygen-supersaturated wastewater or mixed liquor into a biological process zone requiring oxygen, thereby causing part of the oxygen in the mixed liquor to be taken up to support the biological process, and
    directing the mixed liquor to membrane separators to remove water, and causing essentially a remaining portion of supersaturated oxygen in the mixed liquor to evolve from solution as relatively large bubbles which form and rise from beneath the membrane separators with sufficient velocity to cause air scour of the membrane separators in the MBR zone,
    whereby membrane air scouring requirements are reduced by the evolving oxygen bubbles, while the dissolved oxygen can meet most of process oxygen demand.

2. The method of claim 1, wherein the MBR zone comprises said biological process zone requiring oxygen.

3. The method of claim 1, wherein said biological process zone requiring oxygen is a separate zone upstream from the MBR zone.

4. The method of claim 1, wherein said biological process zone requiring oxygen is an aerobic zone separate and upstream from the MBR zone.

5. The method of claim 1, wherein the step of causing supersaturated oxygen in the mixed liquor to evolve from solution is accomplished with an air blower releasing air bubbles below the membrane separators, the air bubbles acting as seed bubbles to cause the oxygen bubbles to evolve.

6. The method of claim 1, wherein the MBR zone comprises said biological process zone requiring oxygen, and wherein the zone is maintained at a minimum level of oxygen available for the biological process so as to promote simultaneous nitrification and denitrification in the zone.

7. The method of claim 1, wherein the oxygen content of the supersaturated wastewater or mixed liquor is between 250 parts per million and about 350 parts per million.

8. The method of claim 1, wherein the step of causing supersaturated oxygen in the mixed liquor to evolve from solution is accomplished by introducing pre-formed seed bubbles into the oxygen-supersaturated wastewater or mixed liquor.

9. The method of claim 8, wherein the injection of pre-formed seed air bubbles is accomplished using air bubbles from a diffuser.

10. In a sewage treatment system and process, a method for increasing efficiency in an MBR tank in which water is removed from mixed liquor, and superoxygenation and air scour are employed, comprising:
    in a tank having membrane filtration units, recycling mixed liquor through an internal recycle stream and in the recycle stream super-oxygenating the mixed liquor beyond normal saturation content of water prior to the return of the mixed liquor to the tank,
    introducing the recycle stream back into the tank generally beneath the membrane filtration units, to release oxygen bubbles, and
    injecting seed air bubbles into the mixed liquor in the recycle stream, to seed the oxygen to cause the oxygen to evolve from solution as relatively large bubbles which form and rise with sufficient velocity to cause air scour of the membrane filtration units.

11. The method of claim 10, wherein the internal recycle stream has a flow rate at least twice the rate of flow of influent to the tank.

12. The method of claim 10, wherein the internal recycle stream has a flow rate at least four times the rate of flow of influent to the tank.

13. The method of claim 10, wherein the internal recycle stream has a flow rate at least five times the rate of flow of influent to the tank.

14. The method of claim 10, wherein the mixed liquor in the internal recycle stream is supersaturated to between 50 and about 300 parts per million oxygen.

15. The method of claim 10, further including promoting simultaneous nitrification and denitrification in the tank by reducing oxygen content in the mixed liquor, alternating with superoxygenating the mixed liquor.

16. The method of claim 10, without any air scour of the membrane filtration units other than bubbling occurring due to the superoxygenation and the seed air bubbles.

17. The method of claim 10, wherein superoxygenation of the mixed liquor is conducted in a pressurized chamber.

18. The method of claim 10, wherein the seed air bubbles constitute no more than about 50% of the volume of oxygen bubbles emerging out of solution.

19. The method of claim 10, wherein the seed air bubbles are introduced in a conduit carrying the recycle stream.

20. The method of claim 10, wherein the seed air bubbles are introduced below the membrane filtration units near a point where the recycle stream is introduced back into the tank.

21. In a sewage treatment system and process, a method for increasing efficiency in an MBR zone with membrane separators in which water is removed from mixed liquor, wherein superoxygenation and air scour are employed, comprising:
    supersaturating influent wastewater or mixed liquor with oxygen prior to biological treatment, so that the wastewater or mixed liquor is oxygenated beyond normal saturation content of water, to an oxygen content of at least 50 parts per million, introducing the oxygen-supersaturated wastewater or mixed liquor into a biological process zone requiring oxygen, thereby causing part of the oxygen in the mixed liquor to be taken up to support the biological process, and directing the mixed liquor to membrane separators to remove water, whereby the dissolved oxygen can meet most of process oxygen demand.

* * * * *